(12) United States Patent
Endo et al.

(10) Patent No.: US 7,842,216 B2
(45) Date of Patent: Nov. 30, 2010

(54) METHOD FOR THE PRODUCTION OF GOLF BALL

(75) Inventors: Seiichiro Endo, Kobe (JP); Masatoshi Yokota, Kobe (JP); Koichi Fujisawa, Kobe (JP); Kazuhiko Isogawa, Kobe (JP)

(73) Assignee: SRI Sports Limited, Kobe (JP)

( * ) Notice: Subject to any disclaimer, the term of this patent is extended or adjusted under 35 U.S.C. 154(b) by 1526 days.

(21) Appl. No.: 11/188,630

(22) Filed: Jul. 26, 2005

(65) Prior Publication Data

US 2006/0049543 A1 Mar. 9, 2006

(30) Foreign Application Priority Data

Sep. 3, 2004 (JP) ............................. 2004-256514

(51) Int. Cl.
B29C 43/18 (2006.01)
B29C 43/02 (2006.01)
B29C 70/70 (2006.01)

(52) U.S. Cl. .................... 264/250; 264/275; 264/279.1; 264/320

(58) Field of Classification Search ....................... None
See application file for complete search history.

(56) References Cited

U.S. PATENT DOCUMENTS

| | | | |
|---|---|---|---|
| 4,337,946 A | 7/1982 | Saito et al. | |
| 5,823,890 A | 10/1998 | Maruko et al. | |
| 6,106,415 A * | 8/2000 | Masutani et al. | ............ 473/374 |
| 6,231,460 B1 * | 5/2001 | Higuchi et al. | ............... 473/374 |
| 6,334,819 B2 * | 1/2002 | Ichikawa et al. | ............. 473/371 |
| 6,390,937 B1 | 5/2002 | Marshall et al. | |
| 6,652,392 B2 * | 11/2003 | Higuchi et al. | ............... 473/374 |
| 2001/0005699 A1 * | 6/2001 | Morgan et al. | ............... 473/376 |
| 2003/0090033 A1 * | 5/2003 | Sugimoto | .................... 264/250 |

FOREIGN PATENT DOCUMENTS

| | | |
|---|---|---|
| JP | 56-68466 A | 6/1981 |
| JP | 10-179795 A | 7/1998 |
| JP | 2001-70476 A | 3/2001 |
| JP | 2001-259083 A | 9/2001 |
| JP | 2003-117975 A | 4/2003 |
| JP | 2004-113703 A | 4/2004 |

* cited by examiner

*Primary Examiner*—Edmund H. Lee
(74) *Attorney, Agent, or Firm*—Birch, Stewart, Kolasch & Birch, LLP (57) ABSTRACT

A core having a center, and a mantle layer comprising a thermoplastic resin composition is provided. Next, a reinforcing layer including a thermosetting resin composition is formed on the surface of this core to obtain a spherical body 40. Next, this spherical body 40 is covered by two pieces of half shell 46. Next, the spherical body 40 and the half shells 46 are placed into a mold 32. Next, the mold 32 is clamped at a velocity of 0.01 mm/sec or greater and 1.0 mm/sec or less. The thermoplastic resin composition of the half shell 46 is heated while being compressed in the spherical cavity to result in flow. This thermoplastic resin composition is hardened to give a cover having a thickness of 0.1 mm or greater and less than 0.7 mm. The difference (T–Fc) between the molding temperature T and the incipient fluidization temperature Fc of the thermoplastic resin composition of the cover is 0° C. or greater and 30° C. or less.

14 Claims, 3 Drawing Sheets

METHOD FOR THE PRODUCTION OF GOLF BALL

This application claims priority on Patent Application No. 2004-256514 filed in JAPAN on Sep. 3, 2004, the entire contents of which are hereby incorporated by reference.

BACKGROUND OF THE INVENTION

1. Field of the Invention

The present invention relates to methods for the production of golf balls. More particularly, the present invention relates to methods of compression molding of a golf ball having a core, a reinforcing layer and a cover.

2. Description of the Related Art

Golf balls are formed by compression molding or injection molding. When golf balls are formed by compression molding, a core and two pieces of a half shell comprising a thermoplastic resin composition are placed into a mold. This resin composition flows within the mold by being heated and compressed. Excess resin composition flows out from a parting line of the mold. A cover is obtained by curing of this resin composition.

Flight performances and control performances are demanded for golf balls. A variety of golf balls have been proposed in an attempt to achieve both the flight performance and the control performance. For example, U.S. Pat. No. 5,823,890 discloses a golf ball having a cover comprising an inner layer and an outer layer, with the inner layer having higher hardness than the outer layer.

Durability is also required for golf balls. Favorable adhesion between the core and the cover enhances durability of the golf ball. U.S. Pat. No. 6,106,415 discloses a golf ball having an adhesive layer between the core and the cover. In this golf ball, the adhesive layer is responsible for the durability.

In compression molding for golf balls having an adhesive layer, excessive flow of the thermoplastic resin composition of the cover causes damage on the adhesive layer by the flow. When the surface of the core is a thermoplastic resin composition, it is likely that flow of this resin composition of the core is also caused. Excessive flow of the resin composition of the core causes significant damage on the adhesive layer. The damage on the adhesive layer reduces durability of the golf ball.

An object of the present invention is to provide a golf ball, which has a cover and a surface of the core, both comprising a thermoplastic resin composition, and which is excellent in durability.

SUMMARY OF THE INVENTION

The method of the production of a golf ball according to the present invention comprises:

(1) reinforcing layer formation step in which a reinforcing layer comprising a thermosetting resin composition is formed on the surface of a core having a mantle layer comprising a thermoplastic resin composition on the outer side thereof to obtain a spherical body;

(2) placing step in which two pieces of a bowl-shaped half shell comprising other thermoplastic resin composition, and the aforementioned spherical body covered by these half shells are placed into a mold having upper and lower mold half each having a hemispherical cavity in the state of this mold open;

(3) clamping step in which this mold is clamped at a velocity of 0.01 mm/sec or greater and 1.0 mm/sec or less whereby the thermoplastic resin composition of the half shell being heated while being compressed in the spherical cavity, accompanied by outflow of excess thermoplastic resin composition from the spherical cavity; and (4) hardening step in which the thermoplastic resin composition of the half shell is hardened to give a cover having a thickness of 0.1 mm or greater and less than 0.7 mm. The difference (T−Fc) between the molding temperature T and the incipient fluidization temperature Fc of the thermoplastic resin composition of the cover is 0° C. or greater and 30° C. or less.

According to the golf ball obtained by this method of the production, intact reinforcing layer is responsible for the adhesion between the core and the cover. This golf ball is excellent in durability.

Preferably, compressive force F1 in the clamping step is 130 kgf or greater and 1900 kgf or less.

Preferably, this method of the production comprises a high pressure step between the clamping step and the hardening step, in which the thermoplastic resin composition of the half shell is compressed in the spherical cavity with a compressive force F2 that is greater than the compressive force F1 in the clamping step. Preferably, ratio (F2/F1) is 1.5 or greater and 30.0 or less.

This method of the production is suited for golf balls having a mantle layer comprising a thermoplastic resin composition containing an ionomer resin as the principal component of the base polymer thereof, and a cover comprising a thermoplastic resin composition containing a thermoplastic polyurethane elastomer as the principal component of the base polymer thereof. This method of the production is suited for golf balls in which the incipient fluidization temperature Fm of the thermoplastic resin composition of the mantle layer is lower than the incipient fluidization temperature Fc of the thermoplastic resin composition of the cover.

DESCRIPTION OF THE PREFERRED EMBODIMENTS

The present invention is hereinafter described in detail with appropriate references to the accompanying drawing according to the preferred embodiments.

Figure 1:
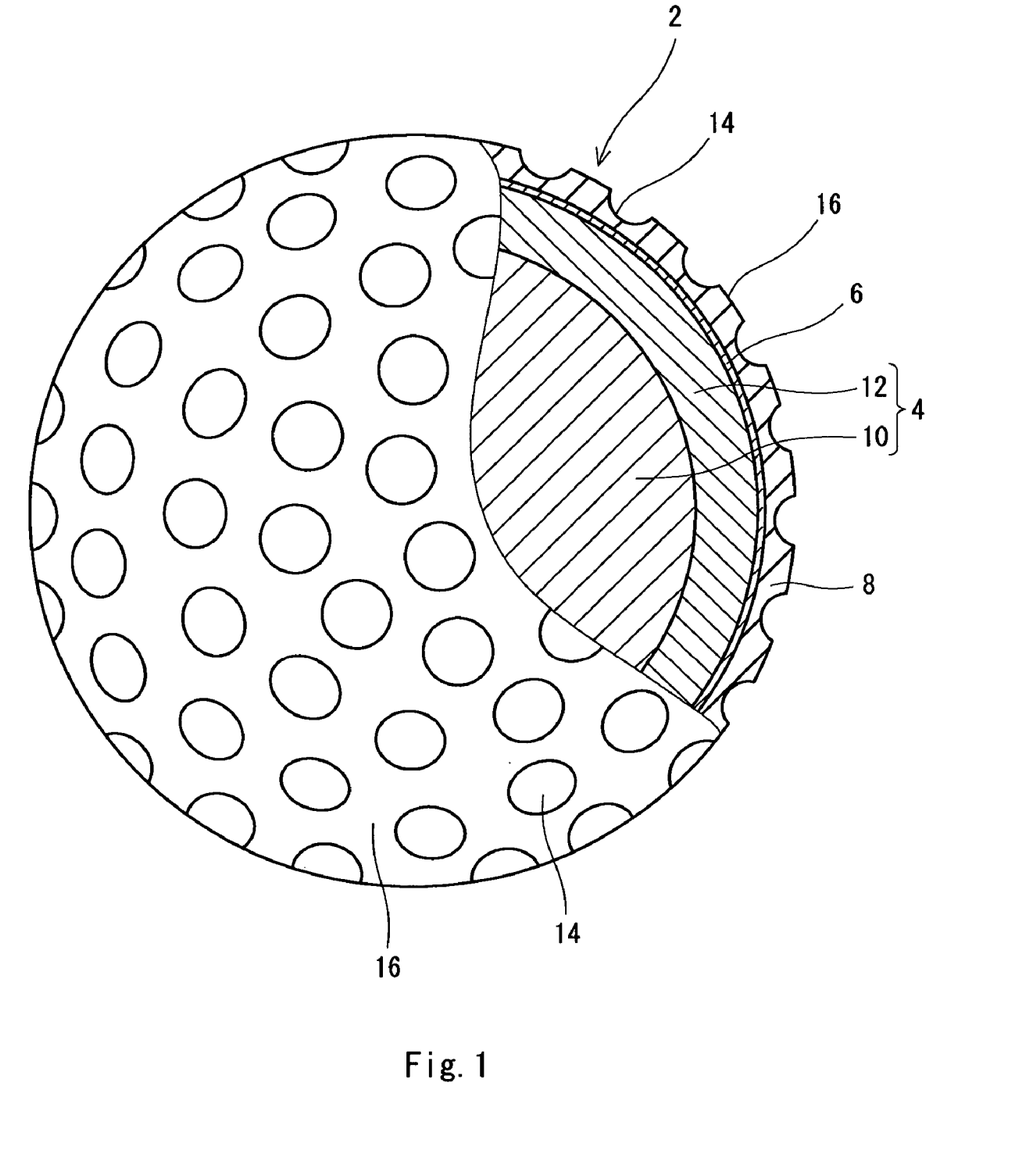
FIG. 1 is a cross-sectional view with a partially cut off portion illustrating a golf ball according to one embodiment of the present invention.

A golf ball 2 depicted in FIG. 1 has a spherical core 4, a reinforcing layer 6 covering this core 4, and a cover 8 covering this reinforcing layer 6. The core 4 comprises a spherical center 10, and a mantle layer 12 covering this center 10. The core 4 may be constituted from the mantle layer 12 alone. Numerous dimples 14 are formed on the surface of the cover 8. Of the surface of the cover 8, a part except for the dimples 14 is a land 16. Although this golf ball 2 has a paint layer and a mark layer to the external side of the cover 8, these layers are not shown in the Figure.

This golf ball 2 has a diameter of from 40 mm to 45 mm. From the standpoint of conformity to a rule defined by United States Golf Association (USGA), the diameter is preferably equal to or greater than 42.67 mm. In light of suppression of the air resistance, the diameter is preferably equal to or less than 44 mm, and more preferably equal to or less than 42.80 mm. Weight of this golf ball 2 is 40 g or greater and 50 g or less. In light of attainment of great inertia, the weight is preferably equal to or greater than 44 g, and more preferably equal to or greater than 45.00 g. From the standpoint of conformity to a rule defined by USGA, the weight is preferably equal to or less than 45.93 g.

The center 10 is obtained through crosslinking of a rubber composition. Illustrative examples of the base polymer of the rubber composition include polybutadienes, polyisoprenes, styrene-butadiene copolymers, ethylene-propylene-diene copolymers and natural rubbers. Two or more kinds of rubbers may be used in combination. In light of the resilience performance, polybutadienes are preferred, and particularly, high-cis polybutadienes are preferred.

For crosslinking of the center 10, a co-crosslinking agent is usually used. Examples of preferable co-crosslinking agent in light of the resilience performance include zinc acrylate, magnesium acrylate, zinc methacrylate and magnesium methacrylate. It is preferred that an organic peroxide is blended together with the co-crosslinking agent into the rubber composition. Examples of suitable organic peroxide include dicumyl peroxide, 1,1-bis(t-butylperoxy)-3,3,5-trimethylcyclohexane, 2,5-dimethyl-2,5-di(t-butylperoxy)hexane and di-t-butyl peroxide.

Various kinds of additives such as a filler, a sulfur compound, an anti-aging agent, a coloring agent, a plasticizer, a dispersant and the like may be blended in an appropriate amount to the rubber composition as needed. The rubber composition may be also blended with crosslinked rubber powder or synthetic resin powder.

The center 10 has a diameter of equal to or greater than 30.0 mm, and particularly equal to or greater than 35.0 mm. The center 10 has a diameter of equal to or less than 41.5 mm, and particularly equal to or less than 41.0 mm. The center 10 may be subjected to a surface treatment such as grinding, blushing, flaming, a plasma treatment or the like. The center 10 may be constituted from two or more layers. Other layer comprising a thermoplastic resin composition may be also provided between the center 10 and the mantle layer 12.

The mantle layer 12 comprises a thermoplastic resin composition. Illustrative examples of the base polymer for use in this resin composition include ionomer resins, thermoplastic polyester elastomers, thermoplastic polyamide elastomers, thermoplastic polyurethane elastomers, thermoplastic polyolefin elastomers and thermoplastic polystyrene elastomers. In particular, an ionomer resin is preferred. Ionomer resins are highly elastic. As described later, this golf ball 2 has a very thin cover 8. Upon hits of this golf ball 2 with a driver, the mantle layer 12 is greatly deformed. The mantle layer 12 in which an ionomer resin is used is responsible for the flight performance upon shots with a driver. When other resin is used in combination with an ionomer resin, the ionomer resin is included as a principal component of the base polymer in light of the flight performance. Proportion of the ionomer resin occupying in the total base polymer is preferably equal to or greater than 50% by weight, more preferably equal to or greater than 70% by weight, and particularly preferably equal to or greater than 85% by weight.

Preferably, an ionomer resin may be used that is a copolymer of α-olefin and an α, β-unsaturated carboxylic acid having 3 to 8 carbon atoms in which a part of the carboxylic acid is neutralized with a metal ion. Examples of preferable α-olefin include ethylene and propylene. Examples of preferable α, β-unsaturated carboxylic acid include acrylic acid and methacrylic acid. Illustrative examples of the metal ion for use in the neutralization include sodium ion, potassium ion, lithium ion, zinc ion, calcium ion, magnesium ion, aluminum ion and neodymium ion. The neutralization may also be carried out with two or more kinds of the metal ions. In light of the resilience performance and durability of the golf ball 2, particularly suitable metal ions are sodium ion, zinc ion, lithium ion and magnesium ion.

Specific examples of the ionomer resin include trade names "Himilan 1555", "Himilan 1557", "Himilan 1605", "Himilan 1706", "Himilan 1707", "Himilan AM7311", "Himilan AM7315", "Himilan AM7317", "Himilan AM7318" and "Himilan MK7320", available from Du Pont-MITSUI POLYCHEMICALS Co., Ltd.; trade names "Surlyn® 7930", "Surlyn® 7940", "Surlyn® 8140", "Surlyn® 8940", "Surlyn® 8945", "Surlyn® 9120", "Surlyn® 9910" and "Surlyn® 9945", available from Dupont; and trade names "IOTEK 7010", "IOTEK 7030", "IOTEK 8000" and "IOTEK 8030", available from EXXON Corporation.

A filler may be blended into the resin composition of the mantle layer 12 for the purpose of adjusting specific gravity and the like. Illustrative examples of suitable filler include zinc oxide, barium sulfate, calcium carbonate and magnesium carbonate. Also, powder consisting of a highly dense metal may be blended as a filler. Specific examples of the highly dense metal include tungsten and molybdenum. Amount of the filler to be blended is determined ad libitum so that the intended specific gravity of the mantle layer 12 can be accomplished. The mantle layer 12 may be also blended with a coloring agent, crosslinked rubber powder or synthetic resin powder.

In light of the flight performance upon a shot with a driver, the mantle layer 12 has a hardness Hm of preferably equal to or greater than 55, more preferably equal to or greater than 58, and particularly preferably equal to or greater than 60. When the hardness Hm is extremely great, to achieve a favorable feeling upon impact of the golf ball 2 may become difficult. In this respect, the hardness Hm is preferably equal to or less than 72, more preferably equal to or less than 70, and particularly preferably equal to or less than 68.

In the present invention, the hardness Hm of the mantle layer 12 and the hardness Hc of the cover 8 are measured in accordance with a standard of "ASTM-D 2240-68". For the measurement, an automated rubber hardness scale which is equipped with a Shore D type spring hardness scale (trade name "LA1", available from Koubunshi Keiki Co., Ltd.) is used. For the measurement, a sheet which is formed by hot press is used having a thickness of about 2 mm and consisting of the same material as the mantle layer 12 (or the cover 8). Prior to the measurement, the sheet is stored at a temperature of 23° C. for two weeks. When the measurement is carried out, three sheets are overlaid.

In light of the flight performance upon a shot with a driver, the mantle layer 12 has a thickness Tm of preferably equal to or greater than 0.3 mm, more preferably equal to or greater than 0.5 mm, and particularly preferably equal to or greater than 0.7 mm. When the thickness Tm is too great, to achieve a favorable feeling upon impact of the golf ball 2 may become difficult. In this respect, the thickness Tm is preferably equal to or less than 2.5 mm, and more preferably equal to or less than 2.0 mm.

In light of adhesion between the mantle layer 12 and the reinforcing layer 6 or the cover 8, the mantle layer 12 is preferably subjected to a surface treatment to increase the roughness thereof. Specific examples of the surface treatment include brushing, grinding and the like.

The reinforcing layer 6 lies between the mantle layer 12 and the cover 8. As described later, the cover 8 of this golf ball 2 is extremely thin. When such a thin cover 8 is hit with an edge of a clubface, a wrinkle is liable to be generated. The wrinkle is generated by displacement of the cover 8 with respect to the mantle layer 12. The reinforcing layer 6 prevents the displacement of the cover 8 with respect to the mantle layer 12. Presence of the reinforcing layer 6 results in suppression of generation of the wrinkle. The reinforcing layer 6 firmly adheres to the mantle layer 12, and also adheres firmly to the cover 8. The reinforcing layer 6 suppresses breakage of the cover 8. The golf ball 2 having the reinforcing layer 6 is excellent in durability. The reinforcing layer 6 reduces energy loss upon a hit of the golf ball 2 with a golf club to improve the resilience performance of the golf ball 2.

For the base polymer of the reinforcing layer 6, a two-component cured thermosetting resin may be suitably used. Specific examples of the two-component cured thermosetting resin include epoxy resins, urethane resins, acrylic resins, polyester based resins and cellulose based resins. In light of the mechanical strength (e.g., strength at break) and durability of the reinforcing layer 6, two-component cured epoxy resins and two-component cured urethane resins are preferred.

The two-component cured epoxy resin is obtained by curing an epoxy resin with a polyamide based curing agent. Illustrative examples of the epoxy resin for use in the two-component cured epoxy resin include bisphenol A type epoxy resin, bisphenol F type epoxy resin and bisphenol AD type epoxy resin. The bisphenol A type epoxy resin is obtained by a reaction of bisphenol A with an epoxy group-containing compound such as epichlorohydrin. The bisphenol F type epoxy resin is obtained by a reaction of bisphenol F with an epoxy group-containing compound. The bisphenol AD type epoxy resin is obtained by a reaction of bisphenol AD with an epoxy group-containing compound. In light of the balance among softness, chemical resistance, heat resistance and toughness, the bisphenol A type epoxy resin is preferred.

The polyamide based curing agent has multiple amino groups and one or more amide groups. This amino group can react with an epoxy group. Specific examples of the polyamide based curing agent include polyamide amine curing agents and denatured products of the same. The polyamide amine curing agent is obtained by a condensation reaction of a polymerized fatty acid with a polyamine. Typical polymerized fatty acid may be obtained by heating naturally occurring fatty acids containing large amounts of unsaturated fatty acids such as linoleic acid, linolenic acid and the like in the presence of a catalyst to perfect the synthesis. Specific examples of the unsaturated fatty acid include tall oil, soybean oil, linseed oil and fish oil. Polymerized fatty acids having a dimer content of equal to or greater than 90% by weight and a trimer content of equal to or less than 10% by weight, and being hydrogenated are preferred. Illustrative examples of preferred polyamine include polyethylene diamine, polyoxyalkylene diamine and derivatives thereof.

Upon mixing of the epoxy resin and the polyamide based curing agent, ratio of epoxy equivalent of the epoxy resin and amine active hydrogen equivalent of the polyamide based curing agent is preferably 1.0/1.4 or greater and 1.0/1.0 or less.

The two-component cured urethane resin is obtained by a reaction of a base material and a curing agent. A two-component cured urethane resin obtained by a reaction of a base material containing a polyol component with a curing agent containing polyisocyanate or a derivative thereof, or a two-component cured urethane resin obtained by a reaction of a base material containing isocyanate group-ended urethane prepolymer with a curing agent having an active hydrogen may be used. In particular, the two-component cured urethane resins obtained by a reaction of a base material containing a polyol component with a curing agent containing polyisocyanate or a derivative thereof are preferred.

It is preferred that an urethane polyol is used as the polyol component of the base material. The urethane polyol has urethane bonds and at least two or more hydroxyl groups. Preferably, the urethane polyol has a hydroxyl group at its end. The urethane polyol maybe obtained by allowing a polyol and a polyisocyanate to react at a ratio such that an excessive molar ratio of the hydroxyl group of the polyol component to the isocyanate group of polyisocyanate is attained.

The polyol for use in production of the urethane polyol has multiple hydroxyl groups. Polyol having a weight average molecular weight of 50 or greater and 2000 or less, and particularly 100 or greater and 1000 or less is preferred. Examples of the polyol having a low molecular weight include diol and triol. Specific examples of the diol include ethylene glycol, diethylene glycol, triethylene glycol, 1,3-butanediol, 1,4-butanediol, neopentyl glycol and 1,6-hexanediol. Specific examples of the triol include trimethylolpropane and hexanetriol. Examples of the polyol having a high molecular weight include polyether polyols such as polyoxyethylene glycol (PEG), polyoxypropylene glycol (PPG) and polyoxytetramethylene glycol (PTMG); condensed polyester polyols such as polyethylene adipate (PEA), polybutylene adipate (PBA) and polyhexamethylene adipate (PHMA); lactone based polyester polyols such as poly-$\epsilon$-caprolactone (PCL); polycarbonate polyols such as polyhexamethylene carbonate; and acrylic polyols. Two or more kinds of polyols may be used in combination.

Polyisocyanate for use in production of the urethane polyol has multiple isocyanate groups. Specific examples of the polyisocyanate include aromatic polyisocyanates such as 2,4-toluene diisocyanate, 2,6-toluene diisocyanate, mixtures of 2,4-toluene diisocyanate and 2,6-toluene diisocyanate (TDI), 4,4'-diphenylmethane diisocyanate (MDI), 1,5-naphthylene diisocyanate (NDI), 3,3'-bitolylene-4,4'-diisocyanate (TODI), xylylene diisocyanate (XDI), tetramethylxylylene diisocyanate (TMXDI) and paraphenylene diisocyanate (PPDI); alicyclic polyisocyanates such as 4,4'-dicyclohexylmethane diisocyanate ($H_{12}$MDI), hydrogenated xylylene diisocyanate ($H_6$XDI), hexamethylene diisocyanate (HDI) and isophorone diisocyanate (IPDI); and aliphatic polyisocyanates. Two or more polyisocyanates may be used in combination. In light of the weather resistance, TMXDI, XDI, HDI, $H_6$XDI, IPDI and $H_{12}$MDI are preferred.

In the reaction of the polyol with the polyisocyanate for producing the urethane polyol, any known catalyst may be used. Typical catalyst may be dibutyltin dilaurate.

In light of strength of the reinforcing layer 6, ratio of urethane bonds included in the urethane polyol is preferably equal to or greater than 0.1 mmol/g. In light of the following capability of the reinforcing layer 6 to the cover 8, the ratio of urethane bonds included in the urethane polyol is preferably equal to or less than 5 mmol/g. The ratio of urethane bonds may be adjusted by adjusting the molecular weight of the polyol to be a raw material, and by adjusting compounding ratio of the polyol and the polyisocyanate.

In light of a short time period required for the reaction of the base material with the curing agent, the urethane polyol has a weight average molecular weight of preferably equal to or greater than 4000, and more preferably equal to or greater than 4500. In light of adhesiveness of the reinforcing layer 6, the urethane polyol has a weight average molecular weight of preferably equal to or less than 10000, and more preferably equal to or less than 9000.

In light of adhesiveness of the reinforcing layer 6, the urethane polyol has a hydroxyl value (mgKOH/g) of preferably equal to or greater than 15, and more preferably equal to or greater than 73. In light of a short time period required for the reaction of the base material with the curing agent, the urethane polyol has a hydroxyl value of preferably equal to or less than 130, and more preferably equal to or less than 120.

The base material may contain, in addition to the urethane polyol, a polyol not having any urethane bond. The aforementioned polyol that is a raw material of the urethane polyol may be used in the base material. Polyols that are miscible with the urethane polyol are preferred. In light of a short time period required for the reaction of the base material with the curing agent, proportion of the urethane polyol in the base material is preferably equal to or greater than 50% by weight, and more preferably equal to or greater than 80% by weight based on the solid content. Ideally, this proportion is 100% by weight.

The curing agent contains polyisocyanate or a derivative thereof. The aforementioned polyisocyanate that is a raw material of the urethane polyol may be used as the curing agent.

The reinforcing layer 6 may include additives such as a coloring agent (typically, titanium dioxide), a phosphate based stabilizer, an antioxidant, a light stabilizer, a fluorescent brightening agent, an ultraviolet absorbent, a blocking preventive agent and the like. The additive may be added to the base material of the two-component cured thermosetting resin, or may be added to the curing agent.

In light of the durability of the golf ball 2, ratio (Tr/Tc) of the thickness Tr of the reinforcing layer 6 to the thickness Tc of the cover 8 is preferably equal to or greater than 0.005, more preferably equal to or greater than 0.010, and particularly preferably equal to or greater than 0.020. When the ratio (Tr/Tc) is too great, resilience coefficient upon shots with a driver, a long iron and a middle iron may become insufficient. In this respect, the ratio (Tr/Tc) is preferably equal to or less than 3.0, and more preferably equal to or less than 2.0.

In light of the durability of the golf ball 2, the reinforcing layer 6 has a thickness of preferably equal to or greater than 0.003 mm, and more preferably equal to or greater than 0.005 mm. In light of easy formation of the reinforcing layer 6, it is preferred that the thickness is equal to or less than 0.30 mm, still more, equal to or less than 0.10 mm, yet more, equal to or less than 0.05 mm, and furthermore, equal to or less than 0.02 mm. The thickness is measured by observation of the cross section of the golf ball 2 with a micro scope. When the surface of the mantle layer 12 has roughness resulting from the surface roughening treatment, the thickness is measured immediately above the protruded portion.

In light of the durability of the golf ball 2, the reinforcing layer 6 has a tensile strength of preferably equal to or greater than 150 kgf/cm$^2$, and more preferably equal to or greater than 200 kgf/cm$^2$. In light of the feel at impact, the tensile strength is preferably equal to or less than 500 kgf/cm$^2$. The tensile strength is measured in accordance with a standard of "JIS K5400". A sample subjected to the measurement is obtained by applying a coating composition on a test plate with a spray gun. The coating composition is kept in an atmosphere of 40° C. for 24 hours. The strain rate for the measurement is 50 mm/min.

The reinforcing layer 6 has a pencil hardness of preferably equal to or greater than 4B. This reinforcing layer 6 prevents the displacement of the cover 8 upon impact with the edge of a clubface, thereby suppressing generation of a wrinkle. In this respect, the pencil hardness is more preferably equal to or greater than 3B, and still more preferably equal to or greater than B. Too high pencil hardness leads to difficulty in following of the reinforcing layer 6 to the cover 8 upon impact with the edge of a clubface. When the following is insufficient, the reinforcing layer 6 is cleaved to generate a wrinkle. In light of suppression of the wrinkle, the pencil hardness is preferably equal to or less than 3H, and more preferably equal to or less than 2H. The pencil hardness is measured in accordance with a standard of "JIS K5400".

The cover 8 comprises a thermoplastic resin composition. Illustrative examples of the base polymer of this resin composition include thermoplastic polyurethane elastomers, thermoplastic polyester elastomers, thermoplastic polyamide elastomers, thermoplastic polyolefin elastomers, thermoplastic polystyrene elastomers and ionomer resins. It is preferred that a thermoplastic polyurethane elastomer is used as the base polymer. The thermoplastic polyurethane elastomers are soft. Great spin rate is achieved when the golf ball 2 having a cover 8 comprising a thermoplastic polyurethane elastomer is hit with a short iron. The cover 8 comprising a thermoplastic polyurethane elastomer is responsible for a control performance upon a shot with a short iron. The thermoplastic polyurethane elastomer is also responsible for the scuff resistance of the cover 8.

The thermoplastic polyurethane elastomer includes a polyurethane component as a hard segment, and a polyester component or a polyether component as a soft segment. Illustrative examples of the curing agent for the polyurethane component include alicyclic diisocyanates, aromatic diisocyanates and aliphatic diisocyanates. In particular, alicyclic diisocyanate is preferred. Because the alicyclic diisocyanate has no double bond in the main chain, yellowing of the cover 8 can be suppressed. Additionally, because the alicyclic diisocyanate is excellent in strength, the cover 8 can be prevented from being scuffed. Two or more kinds of diisocyanates may be used in combination.

Illustrative examples of the alicyclic diisocyanate include 4,4'-dicyclohexylmethane diisocyanate ($H_{12}$MDI), 1,3-bis (isocyanatomethyl)cyclohexane ($H_6$XDI), isophorone diisocyanate (IPDI) and trans-1,4-cyclohexane diisocyanate (CHDI). In light of versatility and processability, $H_{12}$MDI is preferred.

Illustrative examples of the aromatic diisocyanate include 4,4'-diphenylmethane diisocyanate (MDI) and toluene diisocyanate (TDI). Illustrative examples of the aliphatic diisocyanate include hexamethylene diisocyanate (HDI).

Specific examples of the thermoplastic polyurethane elastomer include trade name "Elastollan XNY90A", trade name "Elastollan XNY97A", trade name "Elastollan XNY585" and trade name "Elastollan XKP016N", available from BASF Japan Ltd; and trade name "Rezamin P4585LS" and trade name "Rezamin PS62490", available from Dainichiseika Color & Chemicals Mfg. Co., Ltd.

When other resin is used in combination with a thermoplastic polyurethane elastomer in the cover 8, the thermoplastic polyurethane elastomer is included in the base polymer as a principal component, in light of the control performance. Proportion of the thermoplastic polyurethane elastomer occupying in the total base polymer is preferably equal to or greater than 50% by weight, more preferably equal to or greater than 70% by weight, and particularly preferably equal to or greater than 85% by weight.

Into the cover 8 may be blended a coloring agent such as titanium dioxide, a filler such as barium sulfate, a dispersant, an antioxidant, an ultraviolet absorbent, a light stabilizer, a fluorescent agent, a fluorescent brightening agent and the like in an appropriate amount as needed. Also, the cover 8 may be blended with powder of a highly dense metal such as tungsten, molybdenum or the like for the purpose of adjusting the specific gravity.

The cover 8 has a hardness Hc of preferably equal to or less than 54. By employing such a soft cover 8, a favorable control performance may be accomplished upon a shot with a short iron. In light of the control performance, it is preferred that the hardness Hc is equal to or less than 50, and further, equal to or less than 47. In light of the flight performance upon shots with a driver, a long iron and a middle iron, it is preferred that the hardness Hc is equal to or greater than 20, still more equal to or greater than 28, and yet more equal to or greater than 33.

The cover 8 has a thickness Tc of less than 0.7 mm. As described above, the cover 8 has a low hardness. The cover 8 having such a low hardness is disadvantageous in terms of the resilience coefficient of the golf ball 2. Upon shots with a driver, the mantle layer 12 as well as the center 10 of the golf ball 2 is deformed greatly. By setting the thickness Tc to be less than 0.7 mm, the cover 8 does not adversely affect the resilience coefficient to a large extent upon a shot with a driver, even though the cover 8 has a low hardness. In addition, the air hardly remains during molding of the cover 8 having a thickness Tc of less than 0.7 mm. In light of the flight performance and ease in molding, the thickness Tc is more preferably equal to or less than 0.6 mm, and particularly preferably equal to or less than 0.5 mm. In light of ease in forming the cover 8, the thickness Tc is preferably equal to or greater than 0.1 mm, and more preferably equal to or greater than 0.2 mm.

Figure 2:
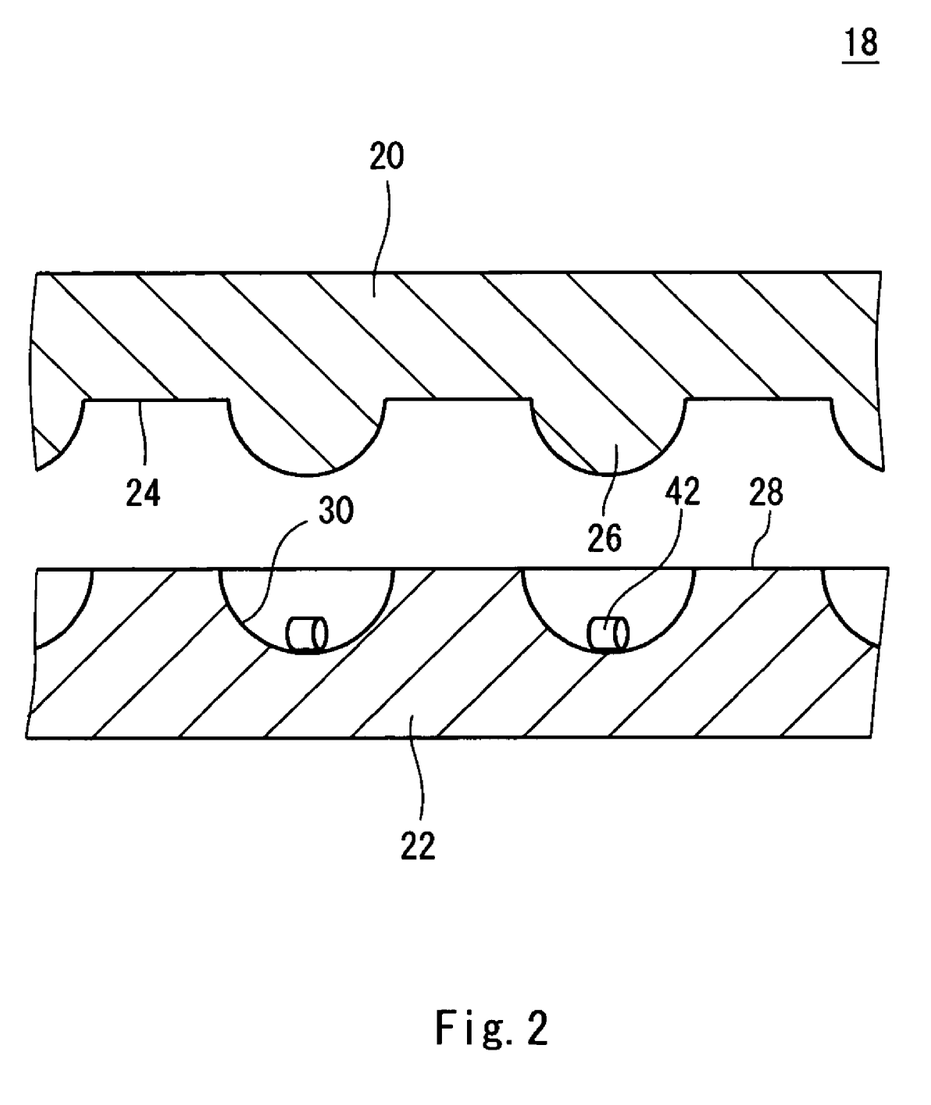
FIG. 2 is a cross-sectional view illustrating a part of the first mold used in the method of the production of the golf ball shown in FIG. 1.

FIG. 2 is a cross sectional view illustrating a part of a first mold 18 for use in the production of the golf ball 2 shown in FIG. 1. The first mold 18 has an upper mold half 20 and a lower mold half 22. The upper mold half 20 has a flat part 24 and a protruding part 26. The surface of the protruding part 26 has a shape that is substantially hemispherical. The lower mold half 22 has a flat part 28 and a recessed part 30. The surface of the recessed part 30 has a shape that is substantially hemispherical. The protruding part 26 has a radius that is smaller than the radius of the recessed part 30. When the upper mold half 20 and the lower mold half 22 are mated, a space is formed between the protruding part 26 and the recessed part 30. When the upper mold half 20 and the lower mold half 22 are mated, a space is formed also between the flat part 24 of the upper mold half 20 and the flat part 28 of the lower mold half 22.

Figure 3:
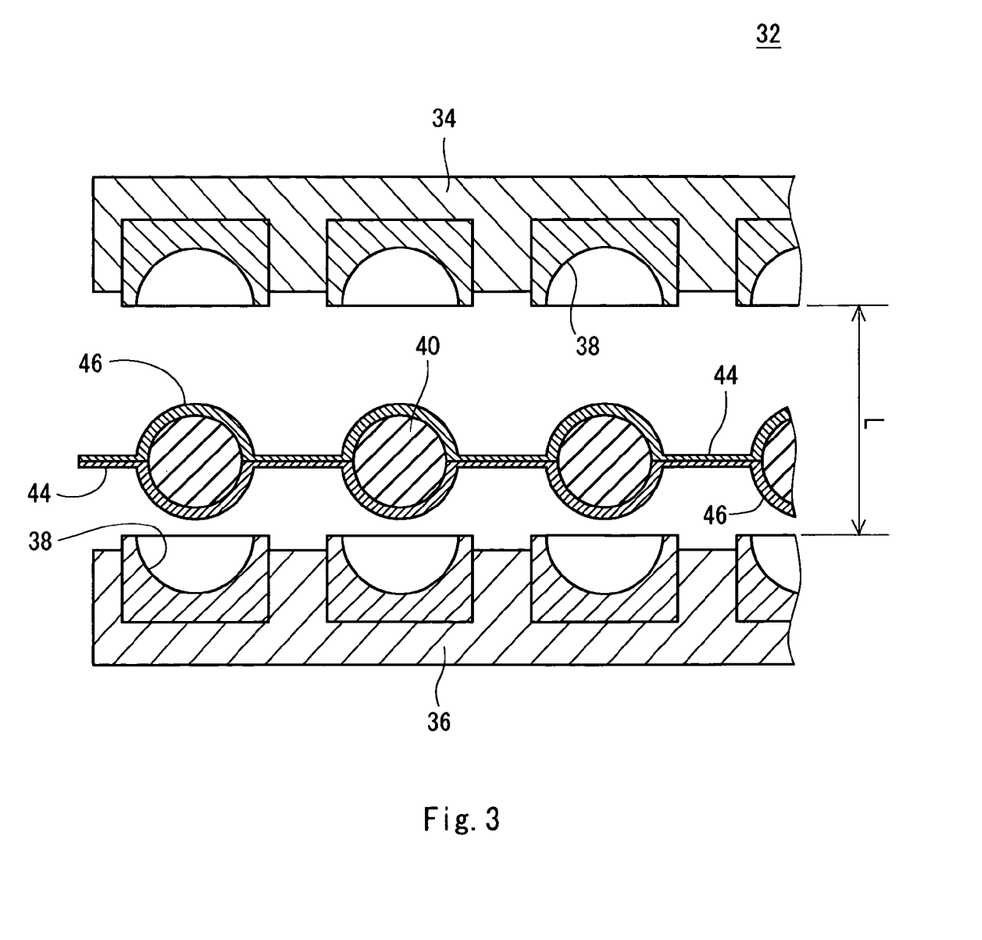
FIG. 3 is a cross-sectional view illustrating a part of the second mold used in the method of the production of the golf ball shown in FIG. 1.

FIG. 3 is a cross sectional view illustrating a part of a second mold 32 for use in the production of the golf ball 2 shown in FIG. 1. The second mold 32 has an upper mold half 34 and a lower mold half 36. Each of the upper mold half 34 and the lower mold half 36 has numerous cavity faces 38, respectively, and hemispherical cavities are formed by these cavity faces 38. When the upper mold half 34 and the lower mold half 36 are mated, spherical cavities are formed. Although not shown in the Figure, numerous pimples are formed on the cavity face 38. As described later, dimples 14 are formed owing to these pimples.

Upon production of the golf ball 2, a base rubber, a crosslinking agent and various additives are first kneaded to obtain a rubber composition. Next, this rubber composition is placed into a mold having an upper mold half and a lower mold half, and having a spherical cavity (not shown in the Figure). Next, this mold is clamped. Next, the rubber composition is heated via the mold. Heating causes a crosslinking reaction of the rubber. The rubber composition is cured through crosslinking. The mold is released, and a spherical center 10 is removed.

This center 10 is placed into a mold (not shown in the Figure) having an upper mold half and a lower mold half, and having a spherical cavity. A melted resin composition is injected around this center 10 according to injection molding. This resin composition is hardened to form the mantle layer 12. Thus, the core 4 comprising the center 10 and the mantle layer 12 is obtained. The mantle layer 12 may be formed also by compression molding.

Next, a liquid comprising a base material and a curing agent dissolved or dispersed in a solvent is applied on the surface of the mantle layer 12. In light of the workability, application with a spray gun is preferred. The solvent is volatilized after the application to permit a reaction of the base material with the curing agent thereby forming the reinforcing layer 6. Illustrative examples of preferred solvent include toluene, isopropyl alcohol, xylene, methyl ethyl ketone, methyl isobutyl ketone, ethylene glycol monomethyl ether, ethylbenzene, propylene glycol monomethyl ether, isobutyl alcohol and ethyl acetate. Accordingly, a spherical body 40 comprising the core 4 and the reinforcing layer 6 is obtained (see, FIG. 3).

On the other hand, a thermoplastic resin and additives are blended, and extruded from an extruder to give a resin composition. Next, this resin composition is cut into a predetermined size. By thus cutting, pellets 42 are obtained (see, FIG. 2). Next, the pellet 42 is placed into the first mold 18. As shown in FIG. 2, the pellet 42 is put on the recessed part 30 of the lower mold half 22. Next, the lower mold half 22 is relatively elevated toward the upper mold half 20, and clamping is carried out. The clamping is usually carried out with a pressing machine. According to the clamping, the pellet 42 is compressed, and heated. The compression and heating results in flow of the resin composition, thereby filling the space between the upper mold half 20 and the lower mold half 22 with the resin composition. Next, the first mold 18 is cooled. By cooling, temperature of the resin composition is also lowered. When the temperature is lowered enough, the first mold 18 is released to remove a preforming material 44. As shown in FIG. 3, the preforming material 44 has numerous half shells 46. The half shell 46 is bowl-shaped. The half shell 46 may be formed also by injection molding.

Next, as shown in FIG. 3, the spherical body 40 is sandwiched between two pieces of the preforming material 44. The spherical body 40 is covered by two pieces of the half shell 46. Next, the preforming material 44 and the spherical body 40 are placed into the second mold 32 that is opened. The half shell 46 and the spherical body 40 are usually put on the cavity face 38 of the lower mold half 36.

Next, the lower mold half 36 is relatively elevated toward the upper mold half 34, thereby allowing the lower mold half 36 to approach the upper mold half 34. This operation is usually carried out with a pressing machine. Velocity of the approaching is 3.0 mm/sec or greater and 200.0 mm/sec or less. This velocity is great. Great velocity results in achievement of a short cycle time. This step is referred to as approaching step.

The approaching step is terminated at the stage in which the distance between the upper mold half 34 and the lower mold half 36 reaches to a predetermined value. Thereafter, the lower mold half 36 is allowed to approach the upper mold half 34 at a velocity of 0.01 mm/sec or greater and 1.0 mm/sec or less, and then, the second mold 32 is finally clamped. The thermoplastic resin composition of the half shell 46 is heated while being compressed in the spherical cavity. The resin composition flows upon compression and heating to cover around the spherical body 40. Excess resin composition flows out from the spherical cavity. This step is referred to as clamping step.

Next, pressure of the pressing machine is elevated. The resin composition of the half shell 46 is compressed in the spherical cavity at a pressure higher than the pressure of in the clamping step. This step is referred to as high pressure step. According to the high pressure step, the upper half shell 46 and the lower half shell 46 are firmly bound. According to the high pressure step, dimples 14 are formed having a shape precisely reflecting the shape of the pimples. The high pressure step may be omitted.

Next, the second mold 32 is cooled in the state of the second mold 32 being clamped. By cooling, the resin composition of the half shell 46 is hardened. This resin composition constitutes the cover 8. This step is referred to as hardening step. Following the hardening, the second mold 32 is released, and the golf ball 2 is removed.

As described above, the lower mold half 36 approaches the upper mold half 34 at a velocity of 0.01 mm/sec or greater and 1.0 mm/sec or less. This velocity is extremely low. Because the second mold 32 migrates slowly, the air existing at inner side of the half shell 46 and between the half shell 46 and the cavity face 38 is eliminated certainly toward outside of the spherical cavity. According to this method of the production, remnant of the air in the golf ball 2 is suppressed. The golf ball 2 without remaining air is excellent in the durability.

As described above, the resin composition of the half shell 46 flows in the clamping step. Because the second mold 32 migrates slowly, rapid flow of the resin composition is not caused. According to this method of the production, the damage of the reinforcing layer 6 involved with flow of the resin composition is suppressed. Because this golf ball 2 has an intact reinforcing layer 6, it is excellent in durability.

Because the mantle layer 12 comprises a thermoplastic resin composition, the mantle layer 12 gets soft when heat conduction of the mantle layer 12 is great in the claming step. If the mantle layer 12 rapidly flows, the reinforcing layer 6 is greatly damaged. Because the second mold 32 slowly migrates, rapid flow of the mantle layer 12 is not caused. According to this method of the production, the damage of therein forcing layer 6 involved with flow of the mantle layer 12 is suppressed. Because this golf ball 2 has an intact reinforcing layer 6, it is excellent in durability.

In light of the durability, the velocity of approach of the lower mold half 36 toward the upper mold half 34 in the clamping step is more preferably equal to or less than 0.8 m/sec, still more preferably equal to or less than 0.5 mm/sec, and particularly preferably equal to or less than 0.2 mm/sec.

Difference (T−Fc) between the molding temperature T and the incipient fluidization temperature Fc of the thermoplastic resin composition of the half shell 46 (i.e., cover 8) is preferably equal to or less than 30° C. This molding temperature T is low. Low molding temperature T prevents rapid flow of the resin composition of the mantle layer 12 and the resin composition of the half shell 46, thereby suppressing the damage of the reinforcing layer 6. Low molding temperature T also suppresses excess outflow of the resin composition of the half shell 46. In this respect, the difference (T−Fc) is more preferably equal to or less than 25° C., and particularly preferably equal to or less than 20° C. The difference (T−Fc) is equal to or greater than 0° C.

The molding temperature T means the maximum temperature attained by the second mold 32 during the time period of from the placing step to the hardening step. The molding temperature T may be measured at the pole of the cavity face 38. The incipient fluidization temperature Fc may be measured by "FLOWSTER CFT-500", available from Shimadzu Corporation. Measurement conditions are as shown below.

Plunger area: 1 cm²
DIE LENGTH: 1 mm
DIE DIA: 1 mm
Load: 588.399 N
Initiation temperature: 30° C.
Temperature elevation rate: 3° C./min Compressive force F1 in the clamping step is preferably equal to or less than 1900 kgf. This compressive force F1 is extremely small. Small compressive force F1 prevents rapid flow of the resin composition of the mantle layer 12 and the resin composition of the half shell 46, thereby suppressing the damage of the reinforcing layer 6. In this respect, the compressive force F1 is more preferably equal to or less than 1300 kgf, still more preferably equal to or less than 900 kgf, and particularly preferably equal to or less than 800 kgf. In light of precise reflection of the shape of the cavity face 38 to the golf ball 2, the compressive force F1 is preferably equal to or greater than 130 kgf. The compressive force F1 is a value obtained by dividing the maximum force applied onto the second mold 32 by the pressing machine in the clamping step, by the number of spherical cavities carried by the second mold 32. The force applied onto the second mold 32 by the pressing machine is a value obtained by multiplying the pressure of the ram of the pressing machine by the cross sectional area of this ram.

Ratio (F2/F1) of the compressive force F2 in the high pressure step to the compressive force F1 in the clamping step is preferably equal to or greater than 1.5, and more preferably equal to or greater than 2.0. The ratio (F2/F1) is preferably equal to or less than 30.0, more preferably equal to or less than 7.0, and particularly preferably equal to or less than 4.0. The compressive force F2 is a value obtained by dividing the maximum force applied onto the second mold 32 by the pressing machine in the high pressure step, by the number of spherical cavities carried by the second mold 32.

What is indicated by a two-headed arrow L in FIG. 3 is a distance between the upper mold half 34 and the lower mold half 36. The distance L upon initiation of the clamping step is preferably equal to or less than 20 mm. Accordingly, a short cycle time may be achieved. In light of the cycle time, the distance L upon initiation of the clamping step is more preferably equal to or less than 10 mm, and particularly preferably equal to or less than 5 mm. In light of suppression of the damage of the reinforcing layer 6, the distance L upon initiation of the clamping step is preferably equal to or greater than 0.5 mm.

As described above, flow of the mantle layer 12 is suppressed according to the method of the production of the present invention. This method of the production is suited for the golf ball 2 having a mantle layer 12 that is liable to flow. Specifically, the method of the production according to the present invention is suited for the golf ball 2 with the difference (Fc−Fm) between the incipient fluidization temperature Fc of the thermoplastic resin composition of the cover 8 (i.e., half shell 46) and the incipient fluidization temperature Fm of the thermoplastic resin composition of the mantle layer 12 being beyond 0° C., still more, equal to or greater than 15° C., and particularly equal to or greater than 30° C.

EXAMPLES

Example 1

A rubber composition was obtained by kneading 100 parts by weight of polybutadiene (trade name "BR-730", available from JSR Corporation), 37 parts by weight of zinc diacrylate, an appropriate amount of zinc oxide, 0.7 part by weight of bis(pentabromophenyl)disulfide and 0.9 part by weight of dicumyl peroxide. This rubber composition was placed into a mold having upper and lower mold half each having a hemispherical cavity, and heated under a temperature of 170° C. for 15 minutes to obtain a center having a diameter of 38.3 mm.

A resin composition was obtained by blending 50 parts by weight of anionomer resin ("Himilan 1605", described above), 50 parts by weight of other ionomer resin ("Surlyn® 9945", described above), 4 parts by weight of titanium dioxide and 0.1 part by weight of ultramarine blue, followed by kneading in a biaxial extruder. This resin composition had an incipient fluidization temperature Fm of 92° C. A mantle layer was obtained by covering around the center with this resin composition by injection molding. This mantle layer had a thickness Tm of 1.6 mm, and JIS-D hardness of 63.

A coating composition containing a two-component cured epoxy resin as a base polymer (trade name "POLIN 750LE", available from Shinto Paint Co., Ltd.) was prepared. The base material liquid of this coating composition consists of 30 parts by weight of a bisphenol A type solid epoxy resin and 70 parts by weight of a solvent. The curing agent liquid of this coating composition consists of 40 parts by weight of denatured polyamide amine, 55 parts by weight of a solvent and 5 parts by weight of titanium oxide. Weight ratio of the base material liquid and the curing agent liquid is 1/1. This coating composition was applied on the surface of the mantle layer with a spray gun, and kept in an atmosphere of 25° C. for 4 hours to give a reinforcing layer. This reinforcing layer had a thickness Tr of 0.005 mm.

A resin composition was obtained by blending 100 parts by weight of a thermoplastic polyurethane elastomer ("Elastollan XNY97A", described above), 4 parts by weight of titanium dioxide and 0.1 part by weight of ultramarine blue, followed by kneading in a biaxial extruder. This resin composition had an incipient fluidization temperature T of 135° C. This resin composition was cut to give pellets. Each one piece of this pellet was placed into every recessed part of a first mold, and a preforming material having numerous half shells was obtained by compression molding.

The spherical body comprising the core and the reinforcing layer was sandwiched between two pieces of the preforming material, placed into a second mold to obtain a cover by compression molding under conditions shown in Table 1 below. This cover had a thickness of 0.6 mm. Painting was applied on the surface of this cover to obtain a golf ball. This golf ball had a diameter of 42.7 mm.

Examples 2 to 3 and Comparative Examples 1 to 2

In a similar manner to Example 1 except that molding conditions were as shown in Table 1 and Table 2 below, a golf ball was obtained.

Examples 4 to 5 and Comparative Examples 3 to 4

In a similar manner to Example 1 except that each layer was constructed as shown in Table 1 and table 2 below, golf balls were obtained. A coating composition comprising a two-component cured urethane resin as a base polymer was used in the reinforcing layer in Example 4. In production of this coating composition, 116 parts by weight of PTMG and 16 parts by weight of 1,2,6-hexanetriol were first dissolved in 120 parts by weight of a solvent (mixed liquid of toluene and methyl ethyl ketone). To this solution was added dibutyltin dilaurate to give the concentration of 0.1% by weight. To this solution was added 48 parts by weight of isophorone diisocyanate dropwise while keeping at 80° C. to obtain a base material liquid containing urethane polyol. Solid content of this urethane polyol was 60% by weight, with a hydroxyl value being 87 mgKOH/g, and with a weight average molecular weight being 7850. This base material liquid, and a curing agent liquid containing isophorone diisocyanate (manufactured by Sumitomo Bayer Urethane Co., Ltd.) were mixed to give a molar ratio of NCO/OH being 1.2. To this liquid were added a light stabilizer (trade name "Sanol LS770", available from Sankyo Co., Ltd.), an ultraviolet absorbent (trade name "TINUVIN® 900", available from Ciba-Geigy Co.) and a fluorescent brightening agent (trade name "UVITEX® OB", available from Ciba-Geigy Co.") to prepare a coating composition. Amounts as added per 100 parts by weight of the urethane resin component are 2 parts by weight for the light stabilizer, 2 parts by weight for the ultraviolet absorbent and 0.2 part by weight for the fluorescent brightening agent.

[Calculation of Incidence Rate of Air Inclusion]

Appearances of 1000 golf balls were visually observed. Incidence rate of defects was calculated through counting the number of golf balls having a site where the air remains within the cover, and the number of golf balls having a site where any bare is generated. The results are presented in Table 1 and Table 2 below.

[Evaluation of Durability]

The golf balls were rendered to hit repeatedly on a metal plate at a velocity of 45 m/s, and the number of times of the hitting until the golf ball was broken was counted. Results of measurement of ten golf balls are shown in Table 1 and Table 2 below.

TABLE 1

| | | Results of evaluation | | | | |
|---|---|---|---|---|---|---|
| | | Example 1 | Example 2 | Example 3 | Comp. Example 1 | Comp. Example 2 |
| Center | Diameter (mm) | 38.3 | 38.3 | 38.3 | 38.3 | 38.3 |
| Mantle layer | Thickness (mm) | 1.6 | 1.6 | 1.6 | 1.6 | 1.6 |
| Reinforcing layer | Thickness Tr (mm) | 0.005 | 0.005 | 0.005 | 0.005 | 0.005 |
| | Pencil hardness | 2H | 2H | 2H | 2H | 2H |
| Cover | Thickness Tc (mm) | 0.6 | 0.6 | 0.6 | 0.6 | 0.6 |
| Ratio (Tr/Tc) | | 0.0083 | 0.0083 | 0.0083 | 0.0083 | 0.0083 |
| Clamping step | Distance L upon initiation (mm) | 0.5 | 20 | 5 | 5 | 200 |
| | Velocity (mm/s) | 0.01 | 1.0 | 0.05 | 0.05 | 40 |

TABLE 1-continued

Results of evaluation

|  |  | Example 1 | Example 2 | Example 3 | Comp. Example 1 | Comp. Example 2 |
|---|---|---|---|---|---|---|
|  | Compressive force F1 (kgf) | 137 | 1375 | 825 | 825 | 3574 |
|  | Time (sec) | 105 | 190 | 105 | 105 | 170 |
| High pressure step | Compressive force F2 (kgf) | 4124 | — | 3574 | 3574 | — |
|  | Time (sec) | 100 | — | 60 | 60 | — |
| Ratio (F2/F1) |  | 30.0 | 1.0 | 4.3 | 4.3 | 1.0 |
| Molding temperature T (° C.) |  | 155 | 135 | 140 | 175 | 140 |
| (T − Fc) (° C.) |  | 20 | 0 | 5 | 40 | 5 |
| Incidence rate of air inclusion (%) |  | 0 | 0 | 0 | 0 | 60 |
| Durability |  | beyond 200 | beyond 200 | beyond 200 | 1 | 32 |
|  |  | beyond 200 | beyond 200 | beyond 200 | 1 | 33 |
|  |  | beyond 200 | beyond 200 | beyond 200 | 1 | 45 |
|  |  | beyond 200 | beyond 200 | beyond 200 | 2 | 58 |
|  |  | beyond 200 | beyond 200 | beyond 200 | 2 | 62 |
|  |  | beyond 200 | beyond 200 | beyond 200 | 3 | 77 |
|  |  | beyond 200 | beyond 200 | beyond 200 | 3 | 77 |
|  |  | beyond 200 | beyond 200 | beyond 200 | 6 | 79 |
|  |  | beyond 200 | beyond 200 | beyond 200 | 9 | 80 |
|  |  | beyond 200 | beyond 200 | beyond 200 | 12 | 94 |

TABLE 2

Results of evaluation

|  |  | Example 4 | Example 5 | Comp. Example 3 | Comp. Example 4 |
|---|---|---|---|---|---|
| Center | Diameter (mm) | 38.3 | 40.9 | 38.3 | 37.5 |
| Mantle layer | Thickness (mm) | 2.0 | 0.6 | 1.6 | 1.6 |
| Reinforcing layer | Thickness Tr (mm) | 0.100 | 0.010 | — | 0.010 |
|  | Pencil hardness | B | 2H | — | 2H |
| Cover | Thickness Tc (mm) | 0.1 | 0.3 | 0.6 | 1.0 |
| Ratio (Tr/Tc) |  | 1.0000 | 0.0333 | — | 0.0100 |
| Clamping step | Distance L upon initiation (mm) | 0.5 | 0.5 | 0.5 | 0.5 |
|  | Velocity (mm/s) | 0.01 | 0.01 | 0.01 | 0.01 |
|  | Compressive force F1 (kgf) | 137 | 137 | 137 | 137 |
|  | Time (sec) | 105 | 105 | 105 | 105 |
| High pressure step | Compressive force F2 (kgf) | 3574 | 3574 | 3574 | 3574 |
|  | Time (sec) | 100 | 100 | 100 | 100 |
| Ratio (F2/F1) |  | 26 | 26 | 26 | 26 |
| Molding temperature T (° C.) |  | 155 | 155 | 155 | 155 |
| (T − Fc) (° C.) |  | 20 | 20 | 20 | 20 |
| Incidence rate of air inclusion (%) |  | 0 | 0 | 0 | 25 |
| Durability |  | beyond 200 | beyond 200 | 1 | 70 |
|  |  | beyond 200 | beyond 200 | 1 | 84 |
|  |  | beyond 200 | beyond 200 | 1 | 88 |
|  |  | beyond 200 | beyond 200 | 1 | 93 |
|  |  | beyond 200 | beyond 200 | 1 | 96 |
|  |  | beyond 200 | beyond 200 | 2 | 101 |
|  |  | beyond 200 | beyond 200 | 2 | 110 |
|  |  | beyond 200 | beyond 200 | 2 | 138 |
|  |  | beyond 200 | beyond 200 | 2 | 139 |
|  |  | beyond 200 | beyond 200 | 2 | 140 |

As is clear from Table 1 and Table 2, air inclusion is suppressed according to the method of each Example. In addition, the golf ball obtained according to the method of the production of each Example is excellent in durability. To the contrary, according to the method of the production of Comparative Example 1, intact cover could not be obtained with the reinforcing layer being exposed due to excess outflow of the resin composition of the cover, thereby achieving insufficient durability of the golf ball. According to the method of the production of Comparative Example 2, air inclusion was found due to the great velocity of the clamping, thereby resulting in insufficient durability of the golf ball. According to the method of the production of Comparative Example 3, durability was insufficient because of absence of the reinforcing layer. According to the method of the production of Comparative Example 4, air inclusion was found due to the cover being thick, thereby resulting in insufficient durability of the golf ball. Accordingly, advantages of the present invention are clearly indicated by these results of evaluation.

The description herein above is merely for illustrative examples, and various modifications can be made without departing from the principles of the present invention.

What is claimed is:

1. A method of the production of a golf ball which comprises:

reinforcing layer formation step in which a reinforcing layer comprising a thermosetting resin composition is formed on the surface of a core having a mantle layer comprising a thermoplastic resin composition on the outer side thereof to obtain a spherical body;

placing step in which two pieces of a substantially semispherical half shell comprising another thermoplastic resin composition, and said spherical body covered by said half shells are placed into a mold having upper and lower mold half each having a hemispherical cavity in the state of said mold open;

clamping step in which said mold is clamped at a velocity of 0.01 mm/sec or greater and 1.0 mm/sec or less whereby the thermoplastic resin composition of the half shell being heated while being compressed in the spherical cavity, accompanied by outflow of excess thermoplastic resin composition from the spherical cavity; and hardening step in which the thermoplastic resin composition of said half shell is hardened to give a cover having a thickness of 0.1 mm or greater and less than 0.7 mm, with the difference (T−Fc) between the molding temperature T and the incipient fluidization temperature Fc of the thermoplastic resin composition of the cover being 0° C. or greater and 25° C. or less.

2. The method of the production according to claim 1 wherein compressive force F1 in said clamping step is 130 kgf or greater and 1900 kgf or less.

3. The method of the production according to claim 1, further comprising a high pressure step between said clamping step and said hardening step, in which the thermoplastic resin composition of the half shell is compressed in said spherical cavity with a compressive force F2 that is greater than the compressive force F1 in the clamping step.

4. The method of the production according to claim 3, wherein ratio (F2/F1) of the compressive force F2 in said high pressure step to the compressive force F1 in said clamping step is 1.5 or greater and 30.0 or less.

5. The method of the production according to claim 1 wherein base polymer of the thermoplastic resin composition of said mantle layer comprises an ionomer resin as the principal component, and base polymer of the thermoplastic resin composition of the cover comprises a thermoplastic polyurethane elastomer as the principal component.

6. The method of the production according to claim 1, wherein incipient fluidization temperature Fm of the thermoplastic resin composition of said mantle layer is lower than the incipient fluidization temperature Fc of the thermoplastic resin composition of the cover.

7. A method of the production of a golf ball which comprises:

reinforcing layer formation step in which a reinforcing layer comprising a thermosetting resin composition is formed on the surface of a core having a mantle layer comprising a thermoplastic resin composition on the outer side thereof to obtain a spherical body;

placing step in which two pieces of a half shell comprising another thermoplastic resin composition, and said spherical body covered by said half shells are placed into a mold having upper and lower mold half each having a hemispherical cavity in the state of said mold open;

clamping step in which said mold is clamped at a velocity of 0.01 mm/sec or greater and 1.0 mm/sec or less whereby the thermoplastic resin composition of the half shell being heated while being compressed in the spherical cavity, accompanied by outflow of excess thermoplastic resin composition from the spherical cavity; and hardening step in which the thermoplastic resin composition of said half shell is hardened to give a cover having a thickness of 0.1 mm or greater and less than 0.7 mm, with the difference (T−Fc) between the molding temperature T and the incipient fluidization temperature Fc of the thermoplastic resin composition of the cover being 0° C. or greater and 25° C. or less.

8. The method of the production according to claim 7, wherein compressive force F1 in said clamping step is 130 kgf or greater and 1900 kgf or less.

9. The method of the production according to claim 7, further comprising a high pressure step between said clamping step and said hardening step, in which the thermoplastic resin composition of the half shell is compressed in said spherical cavity with a compressive force F2 that is greater than the compressive force F1 in the clamping step.

10. The method of the production according to claim 9, wherein ratio (F2/F1) of the compressive force F2 in said high pressure step to the compressive force F1 in said clamping step is 1.5 or greater and 30.0 or less.

11. The method of the production according to claim 7, wherein base polymer of the thermoplastic resin composition of said mantle layer comprises an ionomer resin as the principal component, and base polymer of the thermoplastic resin composition of the cover comprises a thermoplastic polyurethane elastomer as the principal component.

12. The method of the production according to claim 7, wherein incipient fluidization temperature Fm of the thermoplastic resin composition of said mantle layer is lower than the incipient fluidization temperature Fc of the thermoplastic resin composition of the cover.

13. The method of the production according to claim 1, further comprising:

forming step in which the half shell is formed by a pellet.

14. The method of the production according to claim 7, further comprising:

forming step in which the half shell is formed by a pellet.

* * * * *